United States Patent
Shyu et al.

(10) Patent No.: US 7,771,815 B2
(45) Date of Patent: Aug. 10, 2010

(54) MOLDING GLASS LENS AND MOLD THEREOF

(75) Inventors: San-Woei Shyu, Taipei (TW); Chia-Wei Wang, Taipei (TW); Jau-Jan Deng, Taipei (TW); Wen-Huang Liu, Taipei (TW); Chien-Min Wu, Taipei (TW)

(73) Assignee: E-Pin Optical Industry Co., Ltd, Taipei (TW)

( * ) Notice: Subject to any disclaimer, the term of this patent is extended or adjusted under 35 U.S.C. 154(b) by 462 days.

(21) Appl. No.: 11/892,950

(22) Filed: Aug. 28, 2007

(65) Prior Publication Data

US 2010/0040821 A1 Feb. 18, 2010

(51) Int. Cl.
*B32B 3/02* (2006.01)
*B32B 3/00* (2006.01)
*B32B 23/02* (2006.01)
*G02B 3/00* (2006.01)
*G02B 7/00* (2006.01)
*G02B 9/00* (2006.01)
*G02B 11/00* (2006.01)

(52) U.S. Cl. ............... 428/157; 428/156; 428/64.1; 428/66.7; 428/192; 359/642

(58) Field of Classification Search ............... 428/156, 428/157, 167, 192, 64.1, 66.7; 359/642; 65/37, 39; 264/1.32, 2.5
See application file for complete search history.

(56) References Cited

FOREIGN PATENT DOCUMENTS

JP 08337428 A * 12/1996

* cited by examiner

*Primary Examiner*—David R Sample
*Assistant Examiner*—Catherine Simone
(74) *Attorney, Agent, or Firm*—Muncy, Geissler, Olds & Lowe, PLLC

(57) ABSTRACT

A molding glass lens and a mold thereof are disclosed. The molding glass lens consists of an upper optical surface, a lower optical surface, two outers surrounding the optical surfaces and at least three grooves arranged in the form of a circle disposed on the lower outer and/or the upper outer. The disposition of the grooves has no affecting in original size of the outers as well as assembling with other mechanical parts in les group. The mold of the lens includes an upper molding unit and a lower molding unit. Cavity of each molding unit is composed of a central part for forming an optical surface of the lens and an outer circular part for forming outer of the lens. At least three protrudent parts with the same height are disposed in the form of a circle on the outer circular of the lower molding unit and/or the upper molding unit. Thus the air in the mold cavity is easy to exhaust through the gap formed by protrudent parts and glass preform. Therefore, air bubbles generated during the molding processes are prevented and precision of the glass lens is provided.

10 Claims, 6 Drawing Sheets

MOLDING GLASS LENS AND MOLD THEREOF

BACKGROUND OF THE INVENTION

The present invention relates to a molding glass lens and a mold thereof, especially to a mold that includes at least three protrudent parts with the same height disposed in the form of a circle on an outer circular part of a cavity of molding units for achieving better air-exhaust efficiency. Moreover, the molding glass lens formed includes grooves on outer corresponding to the protrudent parts on mold.

The glass precision molding technology has been applied to manufacture spherical and aspherical glass lens with high resolution, good stability and low cost such as lens disclosed in US2006/0107695, US2007/0043463, TW095101830, JP63-295448, and TW095133807. By feature of melting at high temperature, a glass preform is set between upper and lower mold units then processes in vacuum, heated and pressured. Where, the glass preform can be a ball, a gob, a plate, a disc, or polished semi-finished blank. Thus the optical surfaces of upper and lower molding units have been transferred to the soft preform. After cooling, a molding glass lens with optical surfaces is released from the molds.

Since the preform contacts closely with the upper and the lower molds during processes being heated and pressured, once there is a little residual air between preform and molding units, a bubble is formed on optical surface of the lens and this leads to poor quality of the lens. Because the glass preform is set on the lower molding unit, air inside the cavity of the lower molding unit can't be exhausted completely due to pressure from gravity of the glass preform against the lower mold unit when the mold is vacuumed. The following approaches are disclosed in prior arts for solving problems of residual air:

Refer to JP2002-003225, JP05-286730, JP06-191861, US 20050172671, and EP0648712 etc, the problems of residual air is solved by pressure control, temperature control or surface roughness. However, when material, shape or size of the glass preform is changed, the operation conditions should also be changed. Thus control of only single parameter can't solve the problem.

Refer to JP61-291424, TWI248919, JP2000-044260, TW200640807, US20050242454, air channels are disposed on the mold so that air can escape during processes of being heated and pressured. However, such design only works for the glass preform with ball or gob shape. The plate or disc-shaped preform may block the air channels during heating process so that the air exhaust efficiency is reduced.

Refer to JP61-291424, JP08-337428, and U.S. Pat. No. 7,159,420, a groove or an air vent is disposed on the molding unit, especially the lower molding unit. But by such design, corresponding protrudent may occur on the molded lens and this lead to problems in following processing or assembling. In order to reduce size of the protrudent, the size of the groove is restricted and this cause low air-exhaust capability.

Generally, air exhaust effect is represented by air-exhaust efficiency $\delta$ that equals to the cross-sectional area of air-exhaust channels divided by volume of the mold cavity ($\delta$=cross-sectional area of air-exhaust channels/volume of the mold cavity). The larger the air-exhaust efficiency $\delta$ is, the less air accumulates during the molding process. On the contrary, if the air-exhaust efficiency $\delta$ is getting smaller, it's difficult to exhaust the air. The results of long-term experiments show that $\delta$ value of the plate or disc-shaped glass preform should be larger than, said 1.0. Review to the prior arts with disposition of air channels on the mold, once the cross-sectional area of air-exhaust channel is large enough, $\delta$ is nearly 0.25 only. Yet a lot of melt glass will overflow into the air-exhaust channel to form the brim. A further processing is required to shape the brim. Moreover, prior arts with a plurality grooves on the lower molding unit, several protrudents generate on the molding glass lens. Since the protrudents on the surface of lens, the assembling difficulty is leaded. For reducing the protrudents of lens, the cross-sectional of the groove should be smaller, but the air bubble problems propagates due to air-exhaust efficiency is getting poorer by low $\delta$ value.

Therefore, while molding glass lens made by precision glass-molding technology, the design of the mold requires higher air-exhaust efficiency $\delta$. And the molding glass lens should not include any protrudent or brim that requires shaped processing or affects assembling of the lens. Thus both requirements of mass production and high yield rate can be satisfied.

SUMMARY OF THE INVENTION

Therefore it is a primary object of the present invention to provide a molding glass lens that includes an upper optical surface, a lower optical surface, two outers surrounding the optical surfaces. At least three grooves arranged in the form of a circle are disposed on the upper and/or the lower outers so as to increase the air-exhaust efficiency and avoid the disadvantages of protrudents on the lens that affects the accuracy and discommodes in assembly.

It is another object of the present invention to provide a molding glass lens with a plurality of grooves on outer of the lens. There is no restriction in the shape of the groove and one of the grooves may have different shape with others so that the lens has a centrality function that is beneficial to centrality adjustment of the lens or mold repairing.

It is a further object of the present invention to provide a mold of the molding glass lens that includes an upper molding unit, a lower molding unit, and a cavity of each molding unit with a central part for forming an optical surface and an outer circular part. A glass preform setting inside the cavity of mold is molded by vacuuming, heating and pressing process to form the molding glass lens. The mold features on that at least three protrudent parts with the same height are disposed on the outer circular of the cavity of the lower molding unit and/or the upper molding unit so as to exhaust air. The air in the mold cavity is easy to exhaust by vacuuming through gaps formed by differences in height around the protrudent parts in the vacuumed mold so that the air-exhaust efficiency is enhanced. Moreover, corresponding to the prominent protrudent parts of mold, indentation grooves are formed on the outer of the lens. By such design, the yield rate of the molding glass lens is improved and the following assembling processes of the lens are not affected.

It is a further object of the present invention to provide a mold of the molding glass lens that includes protrudent parts with different shapes. The shape of the protrudent should enable the molding glass lens to be easily releasing from the protrudent parts after the lens being molded so as to simplify releasing of the molding glass lens. Moreover, the protrudent parts will not affect the size of the outer of the lens.

It is a further object of the present invention to provide a mold of the molding glass lens that includes at least three protrudent parts disposed in the form of a circle evenly on the outer circular part of the cavity of the molding unit so as to enhance air-exhaust efficiency in vacuum process.

DETAILED DESCRIPTION OF THE PREFERRED EMBODIMENT

Figure 1:
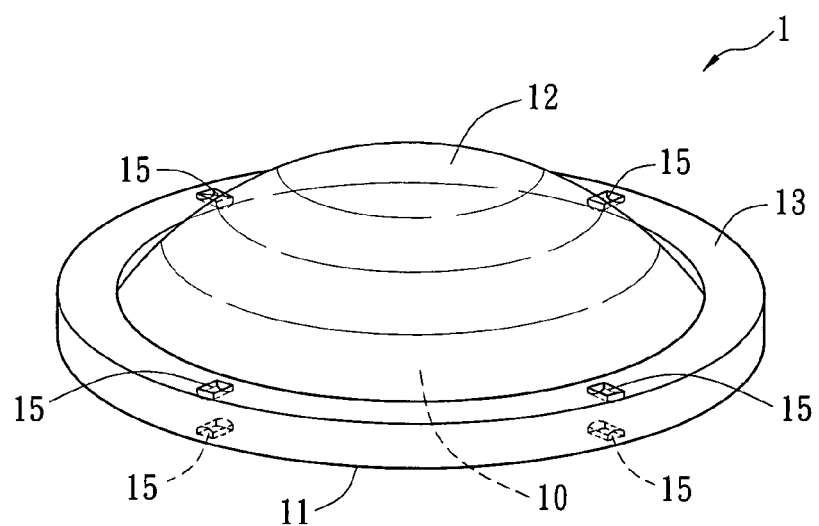
FIG. 1 is a perspective view of an embodiment with four grooves according to the present invention.
Figure 2:
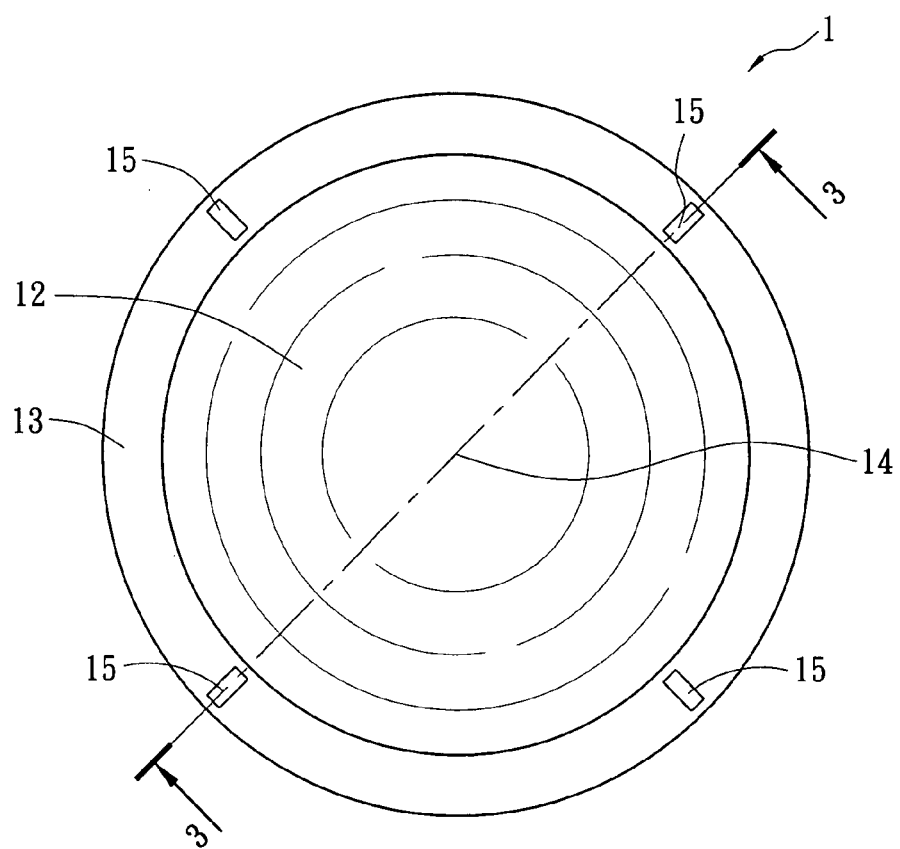
FIG. 2 is a schematic drawing showing top view of the embodiment in FIG. 1.
Figure 3:
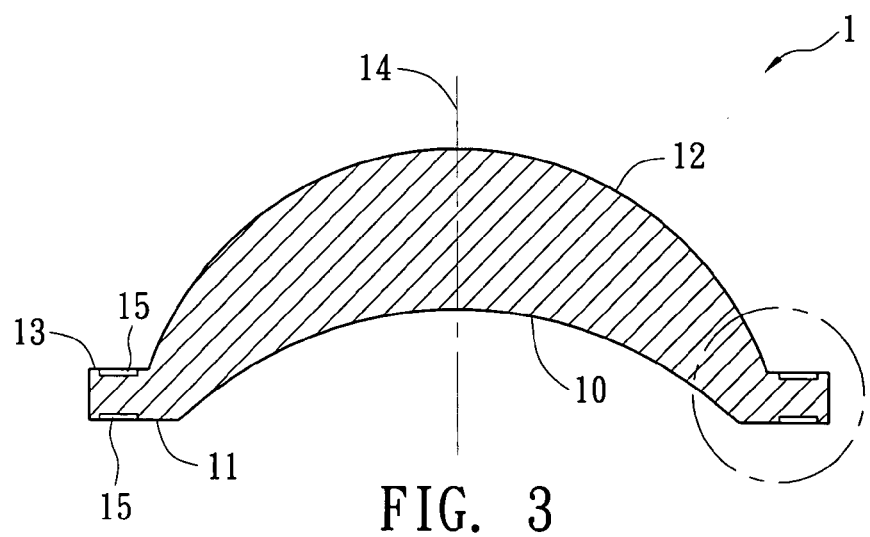
FIG. 3 is a cross sectional view along line 3-3 of the embodiment in FIG. 2.
Figure 4:
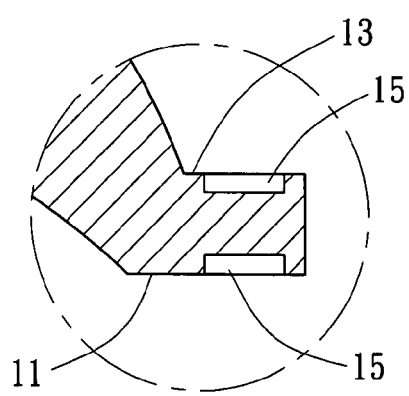
FIG. 4 is a partial enlarged view of a groove of the embodiment in FIG. 3.

Refer to FIG. 1, FIG. 2 & FIG. 3, a molding glass lens 1 according to the present invention includes an upper optical surface (or a first optical surface) 10, an upper outer (or a first outer) 11 surrounding the upper optical surface 10, a lower optical surface (or a second optical surface) 12, and an lower outer (or a second outer) 13 surrounding the lower optical surface 12. The upper and lower optical surfaces 10, 12 are described according to positions of the molds in FIG. 6. Note that the lens in FIG. 1, FIG. 2 & FIG. 3 is positioned in a reverse direction with upside down. Moreover, the upper optical surface 10 and the lower optical surface 12 are main optical area while the upper outer 11 and the lower outer 13 are non-optical area. The non-optical area is mainly used as contacting part while assembling the lens 1 in a base-plate of mechanical part (not shown in figure) or assembling multiple lens elements into lens groups.

Figure 6:
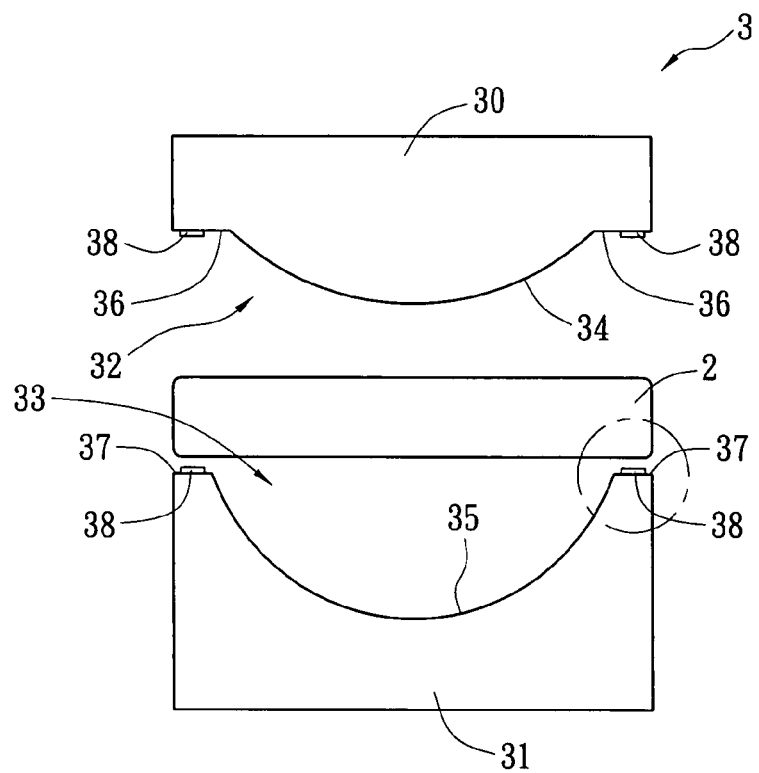
FIG. 6 is a schematic drawing showing cross-sectional view of a mold and a glass preform of an embodiment according to the present invention.
Figure 7:
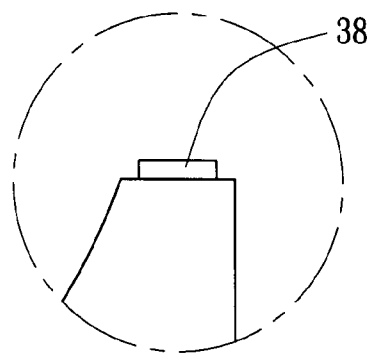
FIG. 7 is a partial enlarged view of a protrudent part of the mold in FIG. 6.

The lens 1 of the present invention is a molding glass lens that is made by a feature of molding at high temperature of glass preform 2. A glass preform 2 is set between upper and lower molding units 30, 31 of mold cavities 32, 33 for being heated and pressed, as shown in FIG. 6. Then vacuum is applied to mold cavities 32, 33 of the upper and lower molding units 30, 31 so as to press the upper and lower molding units 30, 31. Thus the glass preform 2 has surfaces with shape corresponding to central optical parts 34, 35 of the mold cavities 32, 33, respectively forming the upper optical surface 10 and the lower optical surface 12 of the lens 1. After cooling, the upper and lower molding units 30, 31 are released and a molding glass lens 1 is formed.

There is no restriction in optical surfaces of the molding glass lens 10, 12 can be designed with various shapes according to optical requirements. The lens 1 can be biconvex (double convex) if both optical surfaces 10, 12 are convex or convex surface; biconcave lens with two concave or convex surfaces; a convex-concave lens with one convex and one concave side (such as a meniscus lens); a plano-concave shape with one flat surface and the other concave surface; a plano-convex shape with one flat surface and the other convex surface; or lens with other shape such as M-shape with curvature changes from outer sphere to inner sphere. In the embodiment shown in FIG. 1, FIG. 2, & FIG. 3, a convex-concave lens is applied.

Figure 5:
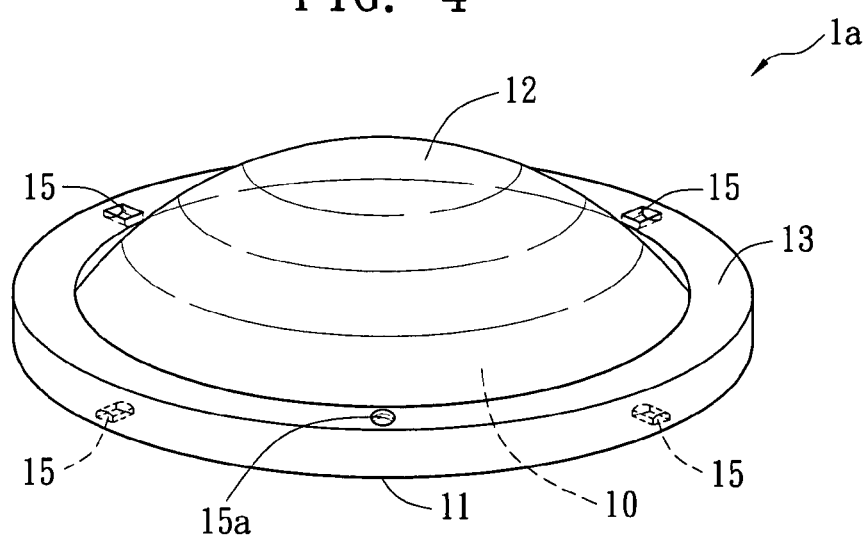
FIG. 5 is a perspective view of another embodiment with three grooves according to the present invention.

Refer from FIG. 1 to FIG. 4, the molding glass lens 1 of the present invention features on that: whiling molding the molding glass lens 1 by the mold 3, at least three grooves 15 arranged in the form of a circle are formed on the lower outer. 13 and/or the upper outer 11 of the lens. As shown in FIG. 1, FIG. 2, & FIG. 3, four grooves 15 are respectively arranged on the lower outer 13 and the upper outer 11 of the lens 1. Refer to FIG. 5, three grooves 15 are respectively arranged on the lower outer 13 and/or the upper outer 11 of the lens 1a. The grooves 15 on the lower outer 13 and the upper outer 11 are not necessarily corresponding to each other. The grooves 15 are indented to outer surfaces of the lower outer 13 or the upper outer 11 so that the grooves 15 will not affect the assembling with other mechanical part in lens group. However, in prior molds, the assembling level and assembling precision have been affected due to prominent protrudent parts formed by disposition of air-exhaust grooves on outers of the lens.

There is no restriction in the shape of the grooves 15 on the outers 11, 13 of the molding glass lens 1 and the shape of grooves 15 can be varied according to the mold cavities 32, 33 of the upper and lower molding units 30, 31. For example, the groove 15 can be strip-shaped, as shown from FIG. 1 to FIG. 4, or hemispherical 15a in FIG. 5, or other shapes such as triangular prism (not shown in figure). The shapes of the groove 15, 15a had better easily to produce (SAG) the mold 3. Furthermore, the grooves 15 on the upper outer 11 and the lower outer 13 can be symmetrical, as shown in FIG. 1, FIG. 2, & FIG. 3, or asymmetrical in FIG. 5. According to design requirements of the lens 1 or producing requirements of the mold 3, the number, shape and disposition way of the groove 15 (15a) on the upper outer 11 and lower outer 13 can be different. In addition, from FIG. 1 to FIG. 5, the size of the groove 15 (15a) is enlarged, not actual size.

One of the plurality of grooves 15 on the upper or lower outers 11, 13 is designed with different shape from others. Refer to FIG. 5, the three grooves 15 arranged on the lower outer 13 of the lens 1a are composed of different shapes, two strip-shaped grooves 14 and a hemispherical groove 15. This enables the lens 1 additional positioning function that is beneficial to centrality adjustment of the lens 1a. The additional positioning function is also applied to mold repairing. Usually a laser centering inspection instrument is used to measure the eccentric value of the lens 1a. The eccentric direction is settled in lens assembling or mold repairing by the groove with different shape such as the hemispherical groove 15a.

Refer from FIG. 6 to FIG. 9, the mold 3 of the molding glass lens 1 (1a) according to the present invention consists of an upper unit and a lower molding unit 30, 31, each having a cavity 32, 33. The cavities 32, 33 are respectively composed of central optical parts 34, 35 for forming optical surfaces 10, 12 of the molding lens 1 (1a) and outer circular parts 36, 37 for forming outers 11, 13 of the molding lens 1 (1a). In lens molding, the vacuum, pressing and heating processes are applied to the upper and lower molding units 30, 31, the glass preform 2 inside the cavities 32, 33 is molded to form a glass lens 1 (1a). The shape of the glass preform 2 is not restricted and it can be a ball, a gob, a plate, a disc, or polished semi-finished blank.

The mold 3 of the molding glass lens according to the present invention is characterized in that: at least three protrudent parts 38 with the same height arranged in the form of a circle are disposed on outer circular parts 37, 36 of the mold cavities 33, 32 of the lower molding unit 31 and/or the upper molding unit 30. Due to such design, even being pressed by gravity, air in the central optical part 35 of the lower mold cavity 33 is easy to escape through gaps formed by differences in height around the protrudent parts 38 in the vacuumed mold. Thus the air-exhaust efficiency is enhanced. As shown in FIG. 1 & FIG. 5, a plurality of grooves 15 formed due to the protrudent parts 38. Comparison with the prior art in solution of the air-exhaust, the indentation grooves of mold carries out the prominent strip on the outers of lens to cause the difficulty in assembling, however, this invention provides the protrudent parts on mold carries out the indentation on the outer of the lens to enhance the precision assembling.

Figure 8:
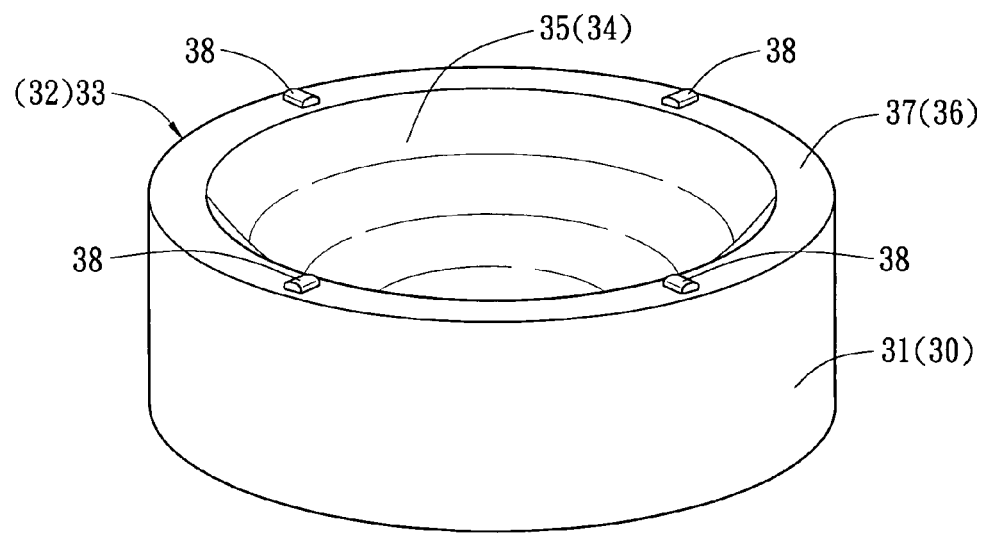
FIG. 8 is a perspective view of a molding unit of the mold shown in FIG. 6.
Figure 9:
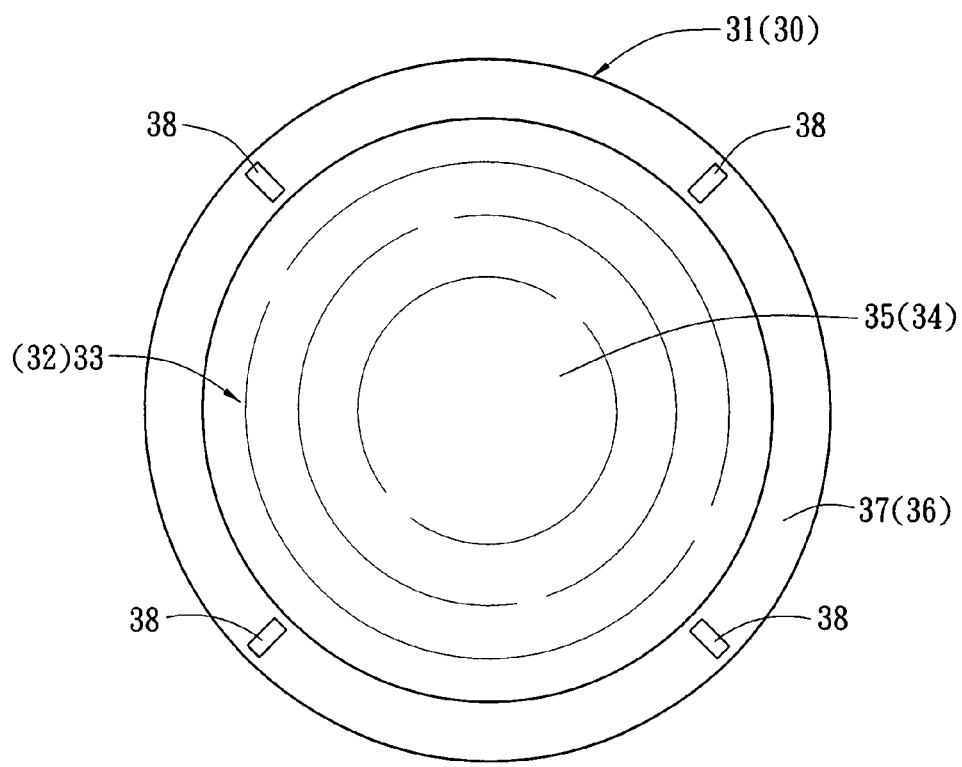
FIG. 9 is a top view of the molding unit in FIG. 8.
Figure 10:
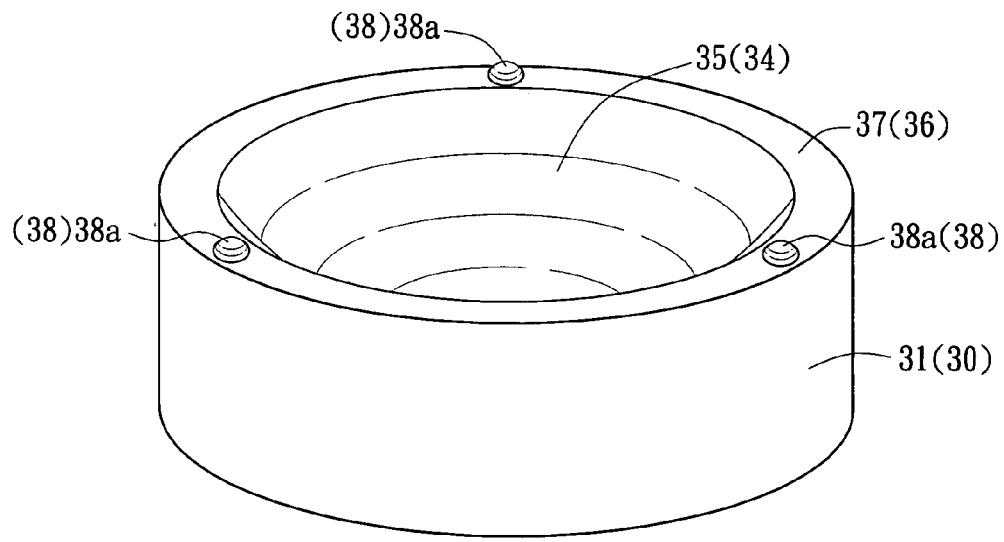
FIG. 10 is a perspective view of a molding unit with three protrudent parts according to the present invention.
Figure 11:
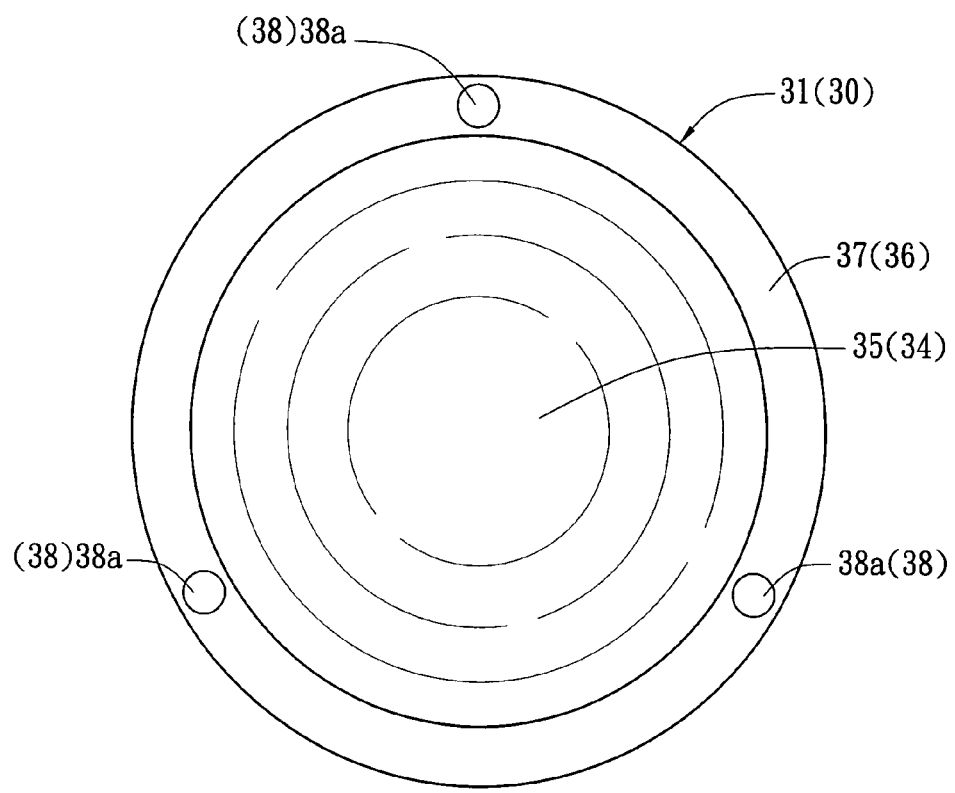
FIG. 11 is a schematic drawing showing top view of the embodiment in FIG. 10.
Figure 12:
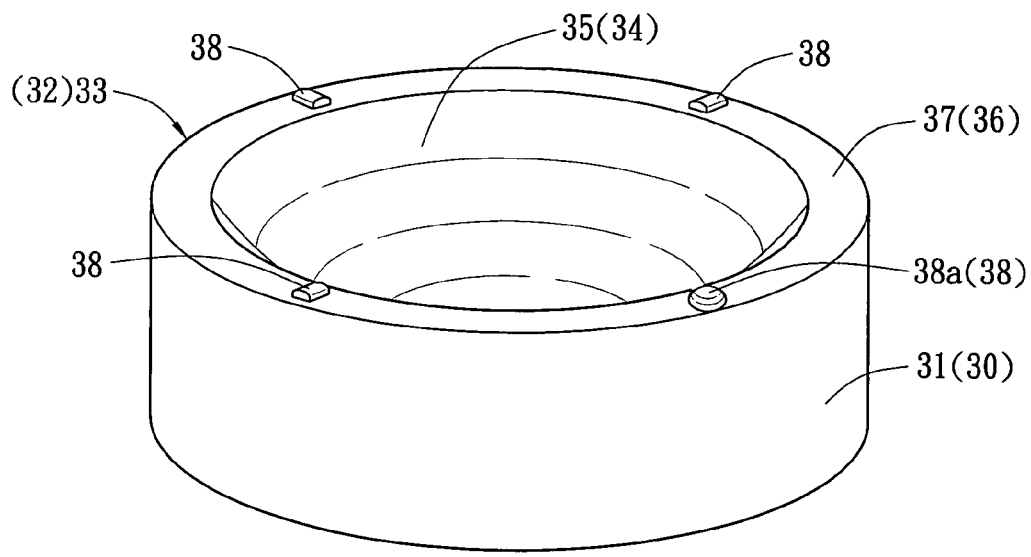
FIG. 12 is a perspective view of another embodiment of the molding unit with four protrudent parts according to the present invention.
Figure 13:
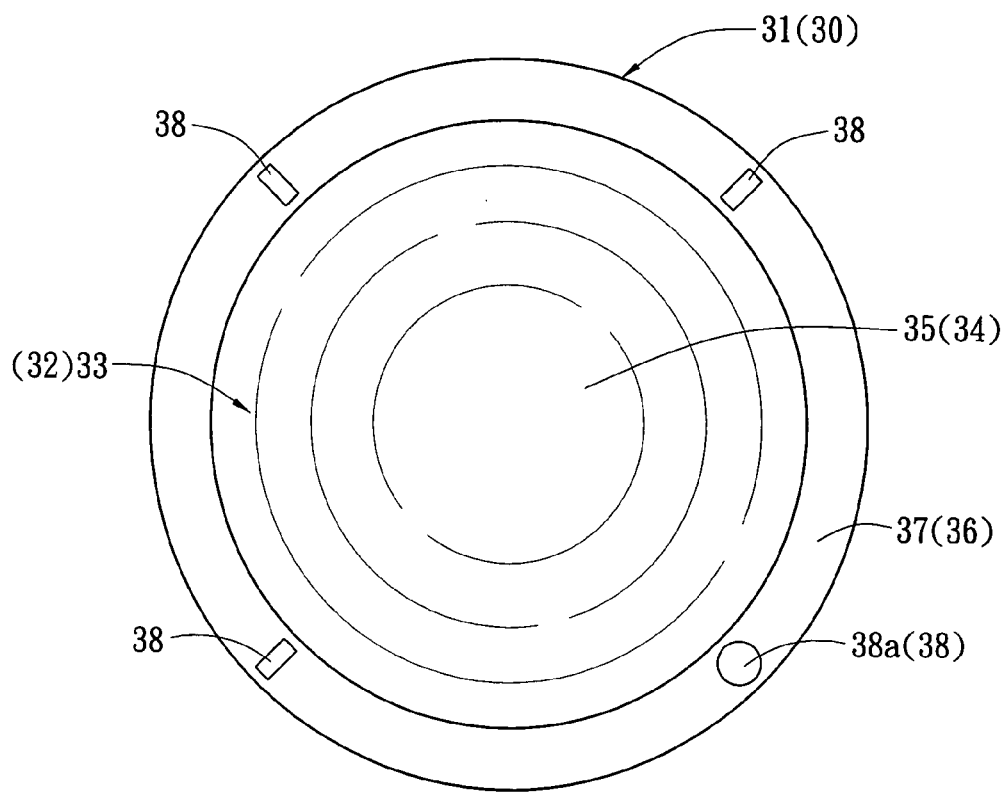
FIG. 13 is a schematic drawing showing top view of the embodiment in FIG. 12.

Different numbers, shapes or arrangements of the protrudent parts 38 with the same height are disposed on the outer circular parts 37, 36 of the mold cavities 33, 32 of the lower molding unit 31 and the upper molding unit 30 in accordance with design requirements of the lens 1 or SAG requirements of the mold 3. It's better that the shape of the protrudent part 38 enables the mold 3 easy to be SAG with required precision. Refer to FIG. 8 & FIG. 9, four strip-like protrudent parts 38 are arranged on the outer circular part 37 (36) of the molding unit 31(30). With reference of FIG. 10 & FIG. 11, three hemispherical protrudent parts 38a(38) are arranged on the outer circular part 37 (36) of the molding unit 31(30). Refer to FIG. 12 & FIG. 13, three strip of protrudent parts 38 and one hemispherical protrudent part 38a(38) are disposed on the outer circular part 37 (36) of the molding unit 31(30). There is no restriction in shape of the protrudent part 38, 38a but the shape thereof must enable the glass lens 1, 1a to be easily released from the protrudent parts 38, 38a. Moreover, the protrudent parts 38, 38a have no influence in the size of the outer that is used as contact area of assembling with other mechanical part in lens group. Furthermore, the protrudent parts 38, 38a on the outer circular parts 36,37 of mold cavities 32, 33 of the molding units 30, 31 can be arranged in different ways such as symmetrical or asymmetrical, even in the same mold 3. Note that, from FIG. 6 to FIG. 9, the size of the protrudent parts 38 is enlarged, not actual size.

The way of disposing the protrudent part 38 (38a) on the outer circular part 37 (36) is preferable in the form of a circle evenly so that air in the cavity 33 (32), especially air in the central optical part 35 of the lower mold cavity 33, can be exhaust quickly through gaps formed by the protrudent part 38 (38a) and mold. The exhausting area, said cross-sectional area of air-exhaust channel is unfolded by the gap during the molding process.

In an embodiment of a biconvex molding glass lens, the radius of the optical surface 12 (10) is 0.77382 mm, the width of the outer 13 (11) is 0.5 mm, the radius of the four hemispherical protrudent parts 38a on the lower molding unit 31 is 0.05 mm, the volume of the molding cavity 33 is 0.15645 $mm^3$. Thus cross-sectional area of air-exhaust channel is 0.2273 $mm^2$, and the air-exhaust efficiency δ is 1.453. Compared with prior arts, if four grooves with depth of 0.1 mm and width of 0.1 mm on the lower molding unit are used as air-exhaust grooves, the cross-sectional area of the air-exhaust groove is 0.004 $mm^2$ and the air-exhaust efficiency δ is 0.256. Therefore, the air-exhaust efficiency of the present invention is far more better than prior arts. The air is exhausted quickly, not blocked in the cavity, thus dissolves the problems of air bubble.

Although the present invention has been described with reference to the preferred embodiment thereof, it is apparent to those skilled in the art that a variety of modifications and changes may be made without, departing from the scope of the present invention which is intended to be defined by the appended claims.

What is claimed is:

1. A molding glass lens formed by a glass preform in set between cavities of upper and lower molding units of a mold being pressured and heated comprising: a first optical surface on one side of the lens, a first outer surrounding the first optical surface, a second optical surface on the other side of the lens and a second outer surrounding the second optical surface; wherein the first optical surface and the second optical surface are optical areas while the first outer and the second outer are non-optical areas being used as contacting surfaces for assembling; wherein, the molding glass lens is characterized in that: at least three grooves disposed in the form of a circle are arranged on at least one of the outers and the groove is formed due to a corresponding protrudent part of the mold for air-exhaust; the groove is indented to surfaces of the outer and thus has no effect on assembling of the molding glass lens; wherein, the mold comprises an upper molding unit and a lower molding unit while a cavity of each molding unit having a central optical part for forming an optical surface of the lens and an outer circular part for forming a outer of the lens; wherein, the mold is characterized in that: at least three protrudent parts with the same height arranged in the form of a circle are disposed on the outer circular part of the at least one molding unit.

2. The molding glass lens as claimed as claim 1, wherein the grooves on the outer of the lens are disposed evenly around circumference of the outer.

3. The molding glass lens as claimed as claim 1, wherein number of the grooves disposed on the first outer is different from number of the grooves disposed on the second outer.

4. The molding glass lens as claimed as claim 1, wherein the grooves arranged on at least one of the outers include at least two different shapes.

5. The molding glass lens as claimed as claim 1, wherein the grooves are disposed on the first outer in different way from the grooves disposed on the second outer.

6. The molding glass lens as claimed as claim 1, wherein the protrudent parts of the mold are disposed evenly on circumference of the outer circular part.

7. The molding glass lens as claimed as claim 1, wherein number of the protrudent parts disposed on the outer circular part of the upper molding unit is different from number of the protrudent parts disposed on the outer circular part of the lower molding unit, or is the same as.

8. The molding glass lens as claimed as claim 1, wherein the protrudent parts disposed on the outer circular part of at least one molding unit include at least two different shapes.

9. The molding glass lens as claimed as claim 1, wherein the protrudent parts disposed on the upper molding unit is in different way from the protrudent parts disposed on the lower molding unit, or is the same as.

10. The molding glass lens as claimed as claim 1, wherein the shape of protrudent part is characterized in easily to release mold for precision.

* * * * *